(12) United States Patent
Koch et al.

(10) Patent No.: US 11,045,917 B2
(45) Date of Patent: Jun. 29, 2021

(54) PRODUCTION DEVICE, IN PARTICULAR ASSEMBLY DEVICE, WORKPIECE COORDINATION DEVICE, SHAPING TOOL, SHAPING TOOL INSERT, QUALITY CONTROL DEVICE OR INSTALLATION GAGE, HAVING WEAR AND/OR MANIPULATION IDENTIFICATION

(71) Applicant: Ford Global Technologies, LLC, Dearborn, MI (US)

(72) Inventors: Raphael Koch, Odenthal (DE); Lars Bognar, Dormagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 16/133,929

(22) Filed: Sep. 18, 2018

(65) Prior Publication Data
US 2019/0084111 A1    Mar. 21, 2019

(30) Foreign Application Priority Data
Sep. 19, 2017 (DE) .......................... 102017216579.0

(51) Int. Cl.
| | |
|---|---|
| *B23Q 17/09* | (2006.01) |
| *B33Y 80/00* | (2015.01) |
| *B32B 1/00* | (2006.01) |
| *B32B 15/08* | (2006.01) |
| *B32B 15/20* | (2006.01) |
| *B32B 15/18* | (2006.01) |
| *B29C 64/00* | (2017.01) |

(Continued)

(52) U.S. Cl.
CPC .......... *B23Q 17/0995* (2013.01); *B29C 64/00* (2017.08); *B32B 1/00* (2013.01); *B32B 15/08* (2013.01); *B32B 15/18* (2013.01); *B32B 15/20* (2013.01); *B33Y 80/00* (2014.12); *B21D 37/01* (2013.01); *B21D 37/20* (2013.01)

(58) Field of Classification Search
CPC ......... B23Q 17/0995; B32B 1/00; G01N 3/56
See application file for complete search history.

(56) References Cited

U.S. PATENT DOCUMENTS

| | | |
|---|---|---|
| 3,660,815 A | 5/1972 | Rees |
| 4,554,853 A | 11/1985 | Nitschmann et al. |

(Continued)

FOREIGN PATENT DOCUMENTS

| | | |
|---|---|---|
| DE | 3926737 | 8/1990 |
| DE | 9300296 | 5/1993 |

(Continued)

*Primary Examiner* — Catherine S Branch
(74) *Attorney, Agent, or Firm* — Burris Law, PLLC

(57) ABSTRACT

A production device having wear and/or manipulation identification is provided. The production device is produced at least for the most part by additive production methods and has a surface. The production device may be constructed as an assembly device, in particular workpiece coordination device, shaping tool or auxiliary technical production device. According to the present disclosure there is provided at least in a region of the surface at least one signal layer which, in an initial state of the production device, is arranged at a predetermined depth below a surface termination layer of the surface and is covered externally by the surface termination layer of the surface. In this instance, the signal layer differs in a visually perceptible manner from the surface termination layer.

17 Claims, 5 Drawing Sheets

(51) Int. Cl.
   *B21D 37/01*   (2006.01)
   *B21D 37/20*   (2006.01)

(56) References Cited

U.S. PATENT DOCUMENTS

| | | |
|---|---|---|
| 4,886,009 A | 12/1989 | Gondar et al. |
| 5,074,983 A | 12/1991 | Eltoukhy et al. |
| 6,513,370 B1 | 2/2003 | Williams |
| 6,520,000 B2 | 2/2003 | Liden et al. |
| 6,682,274 B2 | 1/2004 | Votsch et al. |
| 7,739,974 B1 | 6/2010 | Anderson et al. |
| 8,621,910 B2 | 1/2014 | Biskebom et al. |
| 9,022,143 B2 | 5/2015 | Dupont et al. |
| 9,389,442 B2 | 7/2016 | Ji et al. |
| 2009/0000449 A1 | 1/2009 | Lin et al. |
| 2009/0004449 A1 | 1/2009 | Ban et al. |
| 2011/0005876 A1 | 1/2011 | Jenkinson et al. |
| 2013/0308995 A1 | 11/2013 | Girard |
| 2014/0182144 A1 | 7/2014 | Quimby et al. |
| 2015/0314359 A1 | 11/2015 | Lefevere et al. |
| 2016/0325503 A1 | 11/2016 | Mironets et al. |

FOREIGN PATENT DOCUMENTS

| | | |
|---|---|---|
| DE | 19909871 | 10/2000 |
| DE | 19722593 | 6/2001 |
| DE | 10048899 | 4/2002 |
| DE | 102007011262 | 9/2008 |
| DE | 102007030588 | 1/2009 |
| DE | 102010013343 | 10/2011 |
| DE | 102010042230 | 4/2012 |
| DE | 10346486 | 8/2012 |
| DE | 102011078655 | 1/2013 |
| DE | 102011053716 | 3/2013 |
| DE | 202013101853 | 5/2013 |
| DE | 202013006154 | 7/2013 |
| DE | 102015100699 | 7/2016 |
| DE | 102015117819 | 4/2017 |
| DE | 102016109278 | 9/2017 |
| EP | 0303202 | 2/1989 |
| EP | 0499215 | 8/1992 |
| EP | 1316376 | 6/2003 |
| JP | S60177243 | 9/1985 |
| JP | H0197840 | 4/1989 |
| SU | 1596228 | 9/1990 |
| WO | 2017213784 | 12/2017 |

PRODUCTION DEVICE, IN PARTICULAR ASSEMBLY DEVICE, WORKPIECE COORDINATION DEVICE, SHAPING TOOL, SHAPING TOOL INSERT, QUALITY CONTROL DEVICE OR INSTALLATION GAGE, HAVING WEAR AND/OR MANIPULATION IDENTIFICATION

CROSS-REFERENCE TO RELATED APPLICATIONS

This application claims priority to and the benefit of German Patent Application No. 102017216579.0, filed on Sep. 19, 2017, which is incorporated herein by reference.

FIELD

The present disclosure relates to a production device with a wear and/or manipulation identification, and particularly to a production device with a wear and/or manipulation identification produced using an additive production method.

BACKGROUND

The statements in this section merely provide background information related to the present disclosure and may not constitute prior art.

In the field of mechanical component production, it is known to use assembly devices, shaping tools and similar devices in order to comply with predetermined tolerance requirements placed on the components which are intended to be produced. The assembly devices and shaping tools are also subjected during their use to a mechanical wear which leads to shape changes, which counteracts the compliance with the tolerances when the mechanical wear has progressed too far.

The necessity for controlling mechanical wear is also extremely significant in other fields of technology.

For example, U.S. Patent Publication No. 2011/0005876 A1 describes a brake drum which comprises at least one groove, which is constructed in an inner brake face. The groove defines a maximum uniform depth which is adjusted to a drum rejection diameter. If the groove is visible during the inspection, this is an indication that the brake drum can still be used. When the groove is no longer visible, the brake drum should be disposed of.

A regular control of dimensions of assembly devices, shaping tools and auxiliary technical production devices can be very complex and time-intensive and as a result of downtimes lead to impairments to the efficiency of a production process.

In order to be able to prevent costly examinations of assembly devices, shaping tools and auxiliary devices, different methods have been proposed in the prior art.

U.S. Patent Publication No. 2015/0314359 A1 thus describes a punching tool which comprises an upper shaping tool component, a lower shaping tool component and at least one guiding element which is arranged so as to be able to be actuated in order to guide a relative movement between the upper and the lower shaping tool component. The shaping tool components can be moved relative to each other in a back and forth movement along an axis in order to produce workpieces. The guiding element has a guiding face for guiding a relative movement between the shaping tool components. The guiding element further has at least one wear indicator cavity which is recessed with respect to the guiding face. A depth of the wear indicator cavity corresponds to the extent of a permissible wear of the guiding face. The cavity enables a visual inspection of the extent of wear of the at least one guiding element and consequently prevents the guiding element from having to be removed from the punching tool for inspection.

DE 100 48 899 A1 describes a cutting plate on which a combined coating which comprises a wear protection layer and an indicator layer is provided. The indicator layer is preferably provided on the free face(s), that is to say, in the case of radial plates, on the side faces and, in the case of tangential plates, on the base or covering face. The indicator layer is so sensitive that even a brief use of the adjacent cutting edge leaves behind clear traces on the indicator layer, wherein it becomes discolored and/or worn away so that different-colored layers or materials which are located thereunder become visible. As a result of the clear color contrast or brightness contrast, used cutting edges are immediately readily identifiable. The use of the free faces as indicator faces has therefore been found to be particularly advantageous since in this instance a tribologically potentially also unfavorable coating can be provided without having a negative influence on the processing result of the cutting plate.

U.S. Pat. No. 9,022,143 B2 describes a wear indicator for use in a drill insert or in a drill bit. The wear indicator comprises an elongate element which forms a portion of the drill insert. The elongate element has along the length thereof a large number of numbers, wherein each number is constructed as an empty space or differs visually with respect to the elongate element, and corresponds to a degree of wear in accordance with the IADC (International Association of Drilling Contractors) bluntness evaluation system. In an embodiment, the number may comprise a different material from the elongate element. Alternatively, the number may be produced from the same material as the elongate element, but may be structured or colored in order to provide an optical capacity for distinction. The elongate element may be formed from a plurality of individual portions, which are melted with each other before being inserted into the drill or they may be melted with each other as a part of the production operation for the drill insert. Whilst the drill insert becomes worn, the wear indicator is worn to the same extent in order to show one of the numbers. The numbers range from "1" to "8," wherein the number "1" represents the lowest wear and the number "8" indicates the greatest wear. In the unused state, none of the numbers is visible.

In different fields of mechanical component production, the necessary assembly devices, shaping tools and similar devices are increasingly produced using methods of additive production. Additive production (Additive Manufacturing (AM)) involves the production of components by means of layered construction of material, which is present as a shapeless material and does not require any component-specific tools. Examples of such shapeless raw materials are metal and ceramic powder and thermoplastic plastics materials and synthetic resins.

Assembly devices, shaping tools such as injection-molding tools and auxiliary technical production devices (also for batch production) may be produced nowadays using 3D printing methods, that is to say, additive production. If the mentioned devices and tools are produced from plastics materials, they may be subjected to increased wear compared with metal materials. Uncontrolled and identified wear can have a negative effect on the compliance with required dimensions and consequently on the component quality.

An important example of the assembly devices are specific fittings which must not be manipulated by a user, so-called workpiece coordination devices (Part Coordination Fixture, PCF) which are particularly significant in automotive production technology. An undesirable manipulation may, for example, be carried out by a user when a component does not correspond to the desired dimensions and is nonetheless mounted in the workpiece coordination device. In order to disclose a manipulation which has been carried out in the clearest manner possible, these devices are nowadays milled from metal and provided with a specific surface quality.

In view of the prior art set out, the field of wear control in production devices such as assembly devices, shaping tools and auxiliary technical production devices which are produced at least for the most part by means of additive production methods still leaves room for improvement.

SUMMARY

The present disclosure provides a production device which is produced at least for the most part by additive production methods and which enables a simplified and improved wear control.

It should be noted that the features and measures set out individually in the following description can be combined with each other in any technically advantageous manner and set out other forms of the present disclosure. The description further characterizes and specifies the present disclosure in particular in connection with the Figures.

The production device according to the present disclosure is produced at least for the most part by additive production methods and has a surface. There is provided at least in a region of the surface at least one signal layer which, in an initial state of the production device, is arranged at a predetermined depth below a surface terminal layer of the surface and is covered externally by the surface termination layer, wherein the signal layer differs in a visually perceptible manner from the surface termination layer.

The term "for the most part" in the context of the present disclosure is in particular intended to be understood to be a proportion of more than 50% by vol., such as for example more than 70% by vol. or more than 90% by vol. In particular the term is intended to include the possibility that the production device is produced completely, that is to say, at 100% by vol., by additive production methods.

As a result of the signal layer which is provided, it is visually possible to allow a simplified wear control in the production device. When the signal layer becomes visually perceptible, wear can be identified in the region of the surface.

In one form, the predetermined depth below the surface terminal layer corresponds to a permissible wear limit. When the signal layer becomes visually perceptible, the permissible wear limit has been reached.

In another form, the production device is constructed as an assembly device, in particular, the assembly device is at least one of a workpiece coordination device, shaping tool, shaping tool insert, quality control device or installation gage. It is thereby possible for the efficiency of a production process of components, in which the production device is used, to be increased as a result of saved downtimes for controlling the wear. In particular the mentioned devices can advantageously be used in automotive production.

In the various forms of the production device, there are provided a large number or a plurality of signal layers which are disposed adjacent to each other and parallel to the surface and which differ from each other and individually in a visually perceptible manner from the surface termination layer. The term "large number" is intended, in the context of the present disclosure, to be understood to refer in particular to a number of at least two. In this manner, with the simplified wear control, different degrees of wear can be visually distinguished, whereby indications of a forthcoming time for replacement of the production device which has to be carried out can be obtained.

The different degrees of wear can, in the simplified wear control, be visually identified in a particularly simple manner when two mutually adjacent signal layers of the large number or plurality of mutually adjacent signal layers have different colors.

In one form, the colors of the signal layers of the large number of mutually adjacent signal layers are selected in such a manner that, when they approach a permissible wear limit, they gradually approach a signal color, for example, red, whereby, when the permissible wear limit is reached, replacement of the production device is firmly indicated.

The different degrees of wear may, in the simplified wear control, also be visually identified in a particularly clear manner when in each case two mutually adjacent signal layers of the large number of mutually adjacent signal layers have different patterns since the human perception is particularly suitable for recognizing different patterns or for recognizing changes within a pattern.

In another form, the at least one signal layer has a visually perceptible distinctive feature configured to visually differentiate the at least one signal layer from the surface termination layer and a property of the visually perceptible distinctive feature changes within the at least one signal layer in accordance with the depth below the surface termination layer. In this manner, a semi-quantitative assessment of the wear present can be enabled by a user of the production device.

For example, the at least one signal layer may be constructed in a color which can be differentiated in a visually perceptible manner from the surface termination layer whose color saturation has a gradient in the direction of the depth below the surface termination layer so that the color saturation at greater depth has a higher value.

In yet another form, the region of the surface of the production device comprises a surface of a positioning pin. As a result of the at least one signal layer which is provided at the location of the positioning pin, a simplified wear control can be achieved at a location of the production device which is particularly relevant to production precision.

In other forms of the production device, the surface termination layer has an external texture. It is thereby possible for undesirable manipulations on the production device, for example, by a user, to be promptly identified and a potential loss of production precision to be inhibited. Surface termination layers with an external texture can therefore be used in a particularly advantageous manner in production devices which are constructed as a workpiece coordination device (Part Coordination Fixture, PCF).

In another form, the production device has a predominant proportion of a thermoplastic or thermosetting plastics material. Such production devices may have advantages in the form of a low weight, low production costs and a short production time.

In another aspect of the present disclosure, a method for producing the disclosed production device is proposed.

The method is distinguished according to the present disclosure by at least the following steps:

construction of the production device with the exception of the at least one region of the surface at least for the most part by at least one additive production method;

producing at least one signal layer on the region of the surface by at least one additive production method; and producing a surface termination layer with a predetermined layer thickness by at least one additive production method on the region of the surface.

By using the method, the disclosed production device can be provided in a short production time and with low production costs.

In various forms of the method, the step of producing at least one signal layer is carried out by a 3D color printer. It is thereby possible to achieve a particularly short production time, in particular with production devices having more than one signal layer.

The present disclosure further provides a production device comprising a surface having a plurality of regions, at least one signal layer arranged in each region of the surface, and a surface termination layer covering the signal layer when the production device is in an initial state. The signal layer and the surface termination layer have visually distinct features from each other and are produced by at least one additive production method.

In various forms of the production device, each region of the surface may be defined by a surface of a positioning pin, a property of the visually distinctive feature may change within the signal layer according to a depth below the surface termination layer, and/or the surface termination layer may include an external texture. The visually distinctive feature may be at least one of a color, a pattern, and a texture.

Furthermore, the present disclosure provides a production device comprising a surface having at least one region, a first signal layer arranged in the at least one region of the surface, a second signal layer adjacent the first signal layer, and a surface termination layer covering at least one of the first signal layer and the second signal layer when the production device is in an initial state such that the first and second signal layers are arranged at a predetermined depth below the surface termination layer. The first signal layer, the second signal layer, and/or the surface termination layer have a visually distinct feature and are produced by an additive production method.

In various forms, the visually distinct feature may be a different color, and/or a different pattern. A property of the visually distinct feature may change within the first and second signal layer according to a depth below the surface termination layer. The region of the surface may include a surface of a positioning pin.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
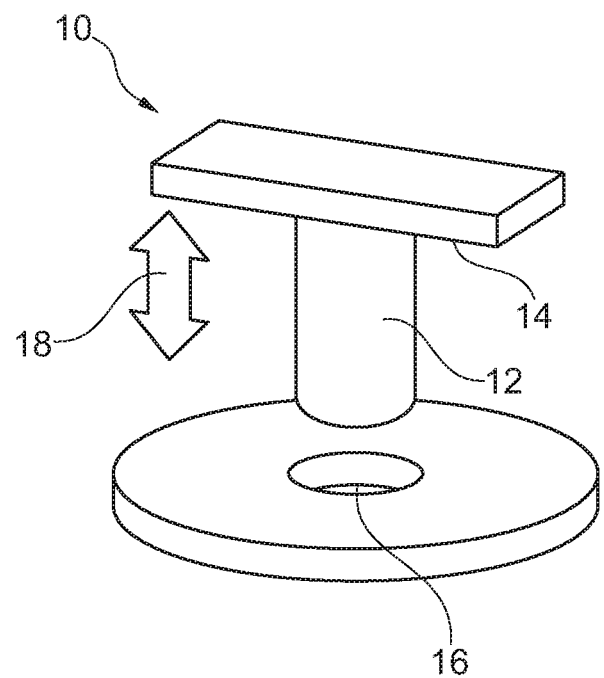
FIG. 1 is a schematic illustration of a production device having a positioning pin according to the present disclosure.
Figure 1:
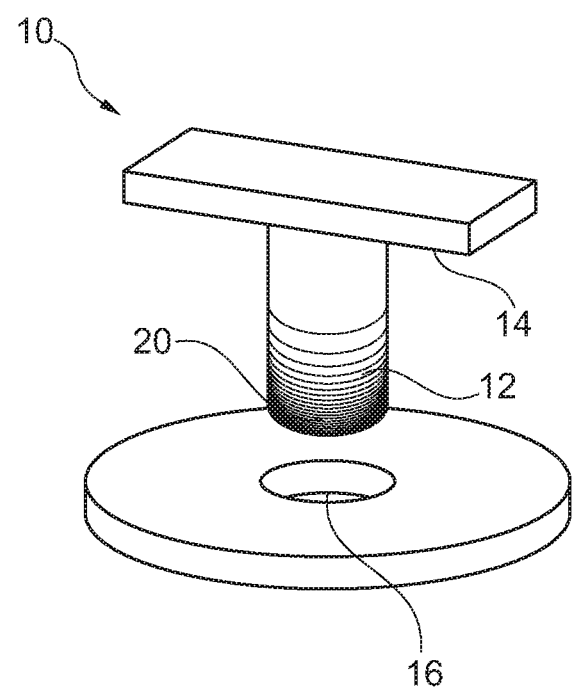

In the various Figures, components which are the same are given the same reference numerals, for which reason they are generally also only described once. The signal color mentioned in the following description naturally cannot be identified as such in the Figures, but can be perceived by black/white shading.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a schematic illustration of one form of a production device 10 according to the present disclosure having a positioning pin 12. The production device 10 may be constructed as an assembly device, in particular, a workpiece coordination device, shaping tool or auxiliary technical production device and is for the most part produced by an additive production method, that is to say, by a 3D printing method, from a thermoplastic plastics material, for example, from ABS (acrylonitrile butadiene styrene copolymer). The production device 10 contains a plurality of cylindrical positioning pins 12 (only one positioning pin 12 is shown in FIG. 1) which serve to comply with predetermined tolerances in the production of components. A surface of the cylindrical positioning pin 12 is part of a surface 14 of the production device 10.

In order to prepare for the production, a circular through-opening 16 of a blank of the component which is intended to be produced, which opening is adapted to a diameter of the positioning pin 12, is pushed in the direction 18 indicated by an arrow onto the positioning pin 12 in order to precisely maintain a predetermined position. As a result of the operation of being pushed on, the positioning pin 12 is subjected to mechanical wear.

Figure 2:
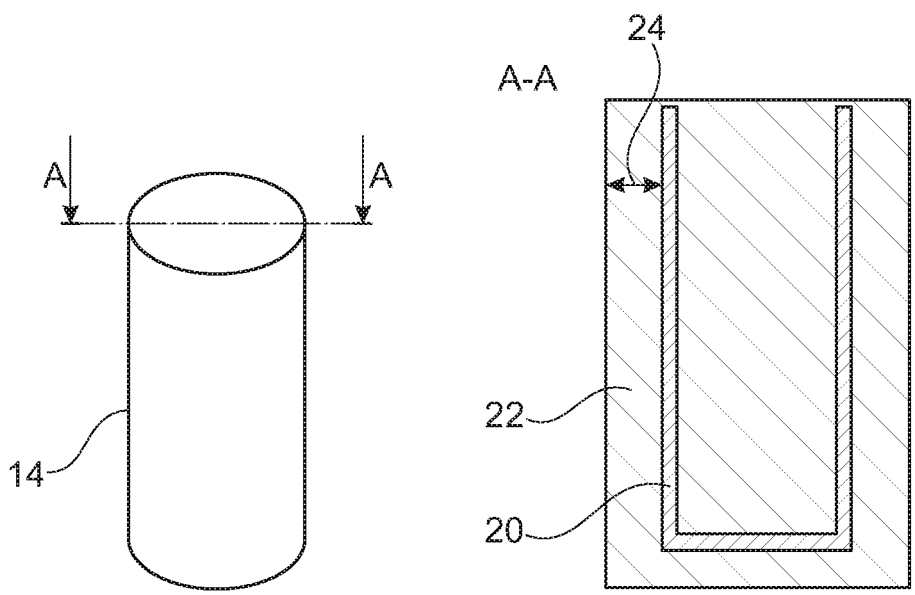
FIG. 2 is a perspective view and a longitudinal section view of the positioning pin according to FIG. 1 in an unused and in a used state.
Figure 2:
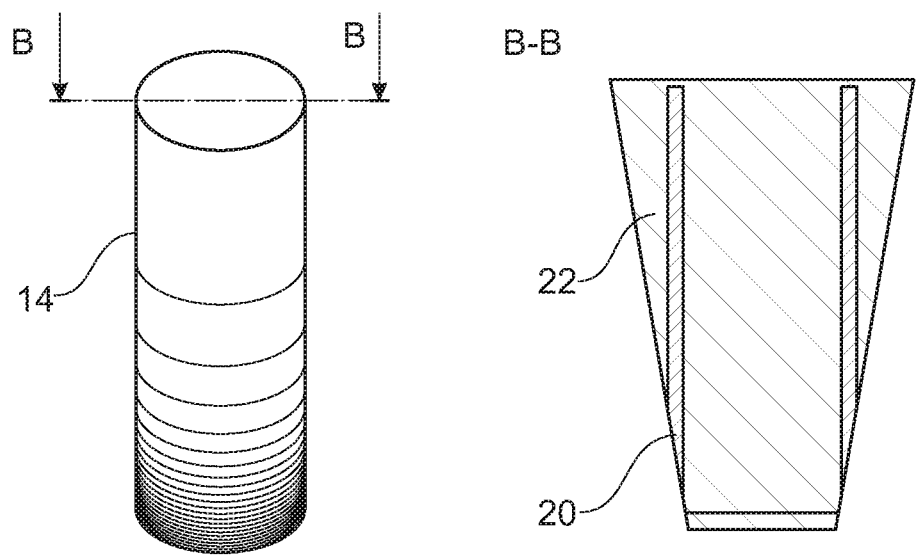

FIG. 2 shows the positioning pin 12 according to FIG. 1 in an unused state (top of the figure) and in a used state (bottom of the figure) as a perspective view and as a longitudinal section. A signal layer 20 is provided in a region of the surface 14 of the production device 10, that is to say, in a region of the surface of the positioning pin 12. The signal layer 20 is covered externally by a surface termination layer 22 of the surface 14. The surface termination layer 22 has a predetermined layer thickness 24, whereby the signal layer 20 in the initial state of the production device 10 shown at the top in FIG. 2 is arranged at a predetermined depth below the surface termination layer 22. The predetermined layer thickness 24 of the surface termination layer 22 corresponds to a permissible wear depth.

For clarification, in FIG. 2, the signal layer 20 and the surface termination layer 22 are illustrated in a significantly enlarged manner relative to the dimensions of the positioning pin 12. This applies accordingly to the following Figures.

Figure 6:
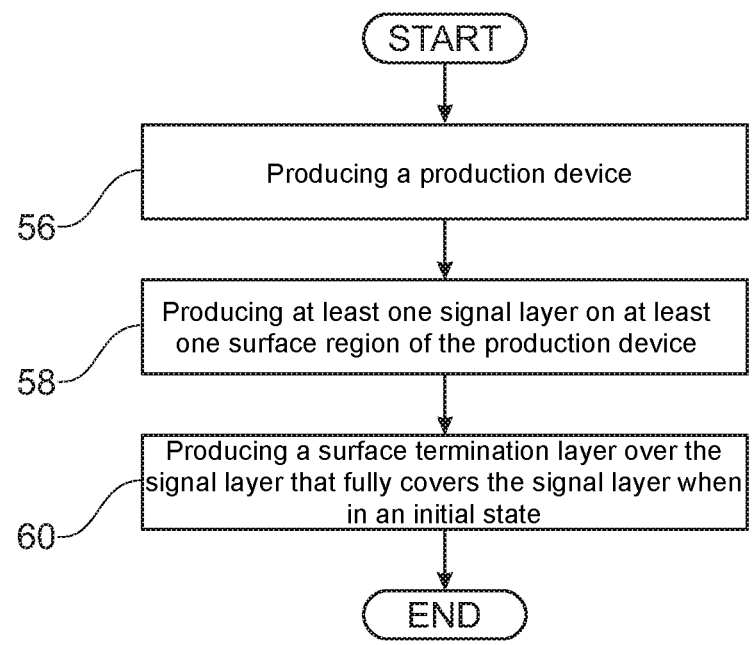
FIG. 6 is a flow chart of a method for producing the production device of FIG. 1 according to the present disclosure.

FIG. 6 shows a flow chart of a method according to the present disclosure for producing the production device according to FIG. 1.

In a first step 56 for producing the production device 10, the construction of the production device 10 first takes place, with the exception of the region of the surface of the positioning pin 12, by the 3D printing method. In a following step 58 of the method, the signal layer 20, which has a material having a red signal color, is produced by the 3D printing method on the region of the surface of the positioning pin 12. In a subsequent step 60, the surface termination layer 22 is produced by the 3D printing method with the predetermined layer thickness 24 on the region of the surface of the positioning pin.

As illustrated in FIG. 2, at the bottom, the wear which occurs during use of the production device 10 leads at one end of the positioning pin 12 to the layer thickness 24 of the surface termination layer 22 gradually decreasing until the signal layer 20 in a part-region is no longer covered externally by the surface termination layer 22.

The signal layer 20 which has a material with, for example, a red signal color, visually differs in a clearly perceptible manner from the surface termination layer 22. An appearance of the signal layer 20 on the positioning pin 12 shows the user of the production device 10 in a direct manner that the permissible wear limit is reached.

In an alternative form, the signal layer 20 may have as a visually perceptible distinctive feature with respect to the surface termination layer 22 within the signal layer 20 a gradient in the color saturation in the direction of the depth below the surface termination layer 22 so that at a small depth the red signal color appears more pale than at a greater depth. A semi-quantitative assessment of the present wear by the user can thereby be made possible.

Figure 3:
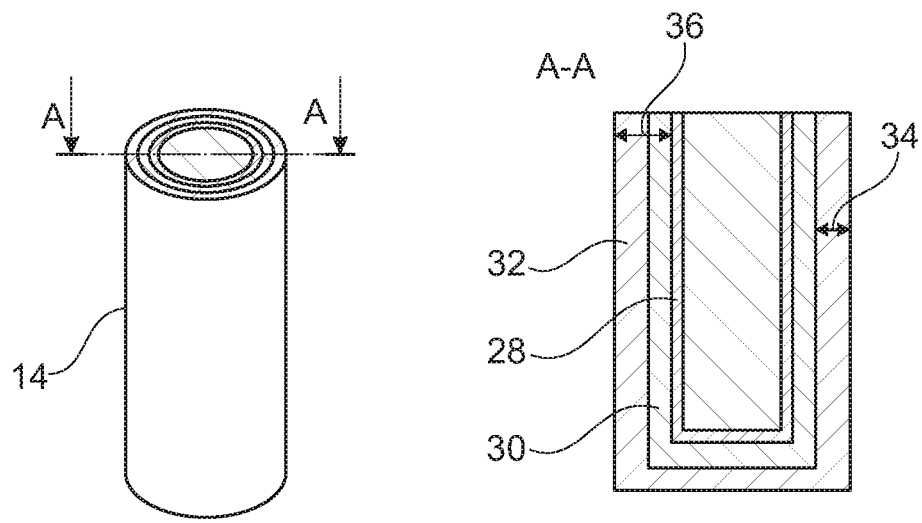
FIG. 3 is a perspective view and a longitudinal section view of an alternative form of a positioning pin of a production device according to the present disclosure.
Figure 3:
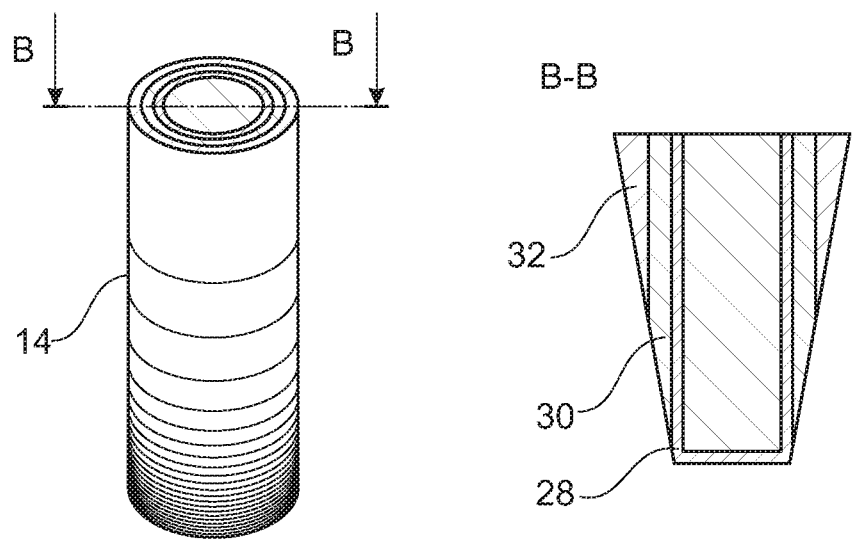

FIG. 3 shows an alternative form of a positioning pin 26 of the production device 10 according to the present disclosure according to FIG. 1 as a perspective view and as a longitudinal section.

FIG. 3 shows the cylindrical positioning pin 26 of the production device 10 according to the present disclosure according to FIG. 1 in an unused state (top) and in a used state (bottom) as a perspective view and as a longitudinal section. In a region of the surface 14 of the production device 10, that is to say, in a region of the surface of the positioning pin 26, a large number of two signal layers 28, 30 is provided in contrast to the form according to FIG. 2.

The two signal layers 28, 30 are arranged adjacent to each other parallel to the surface and differ from each other and individually in a visually perceptible manner from a surface termination layer 32 in that during the step of the method the two signal layers 28, 30 which each have a material having a different signal color are produced one after the other by the 3D printing method at predetermined layer thicknesses firstly on the positioning pin 26 and then on the signal layer 28 which has already been formed.

The two signal layers 28, 30 are covered externally by the surface termination layer 32 of the surface. The surface termination layer 32 has a predetermined layer thickness 34, whereby each of the two signal layers 28, 30 in the initial state of the production device illustrated at the top in FIG. 3 is arranged at a predetermined depth below the surface termination layer 32. A spacing 36 from the surface termination layer 32 of the unused production device 10 as far as the first signal layer 28 corresponds to a permissible wear limit.

In an alternative form, the two signal layers may also differ in a visually perceptible manner, instead of as a result of the two different colors, as a result of the fact that they have different patterns. The patterns may, for example, without being limited thereto, be constructed in a dotted and/or striped manner.

Figure 4:
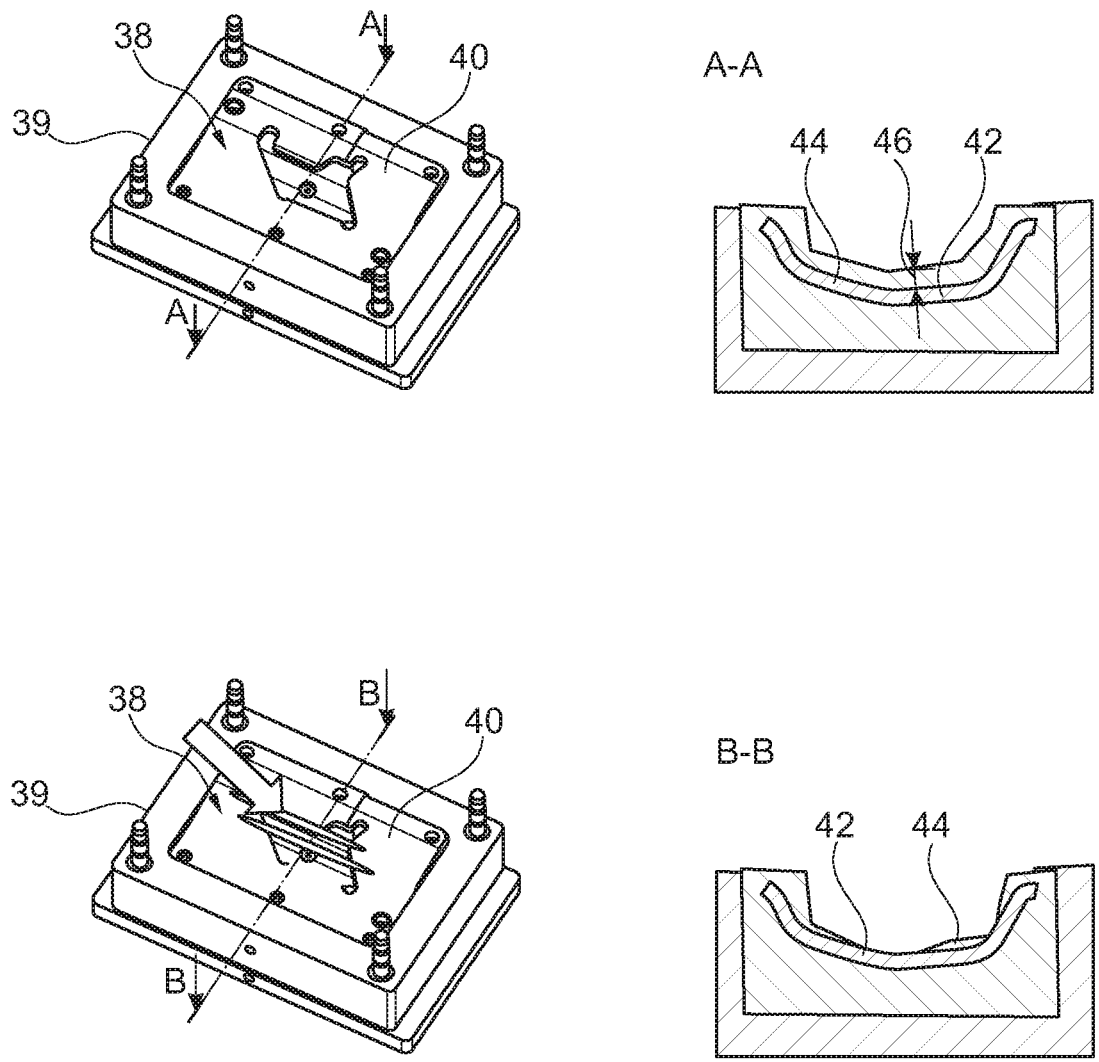
FIG. 4 is a perspective view and a longitudinal section view of an alternative form of a production device constructed as a shaping tool in an unused state and in a used state according to the present disclosure.

In FIG. 4, one form of the production device according to the present disclosure for retention in a tool receiving member 39, which is constructed as a shaping tool insert 38, is illustrated schematically in an unused state (top of the figure) and in a used state (bottom of the figure) as a perspective view and as a longitudinal section. The shaping tool insert 38 is produced by a 3D printing method.

A surface 40 of the shaping tool insert 38 is subjected during use to mechanical wear. In a central region of the surface 40 there is provided a signal layer 42 which has a material with, for example, a red signal color. The signal layer 42 is in an initial state covered externally by a surface termination layer 44 of the surface 40. The surface termination layer 44 has a predetermined layer thickness 46, whereby the signal layer 42 in the initial state of the shaping tool insert 38 shown at the top in FIG. 4 is arranged at a predetermined depth below the surface termination layer 44. The predetermined layer thickness 46 of the surface termination layer 44 corresponds to a permissible wear limit.

A method for producing the signal layer 42 and the surface termination layer 44 corresponds to the method described for producing the form according to FIG. 2.

The wear which occurs during use of the shaping tool 38 leads to the layer thickness 46 of the surface termination layer 44 gradually decreasing until the signal layer 42 in a part-region is no longer externally covered by the surface termination layer 44.

As a result of the material with, for example, a red signal color, the signal layer 42 differs in a visually clearly perceptible manner from the surface termination layer 44. An appearance of the signal layer 42 on the surface 40 of the shaping tool insert 38 shows the user of the shaping tool insert 38 directly that the permissible wear limit has been reached.

Figure 5:
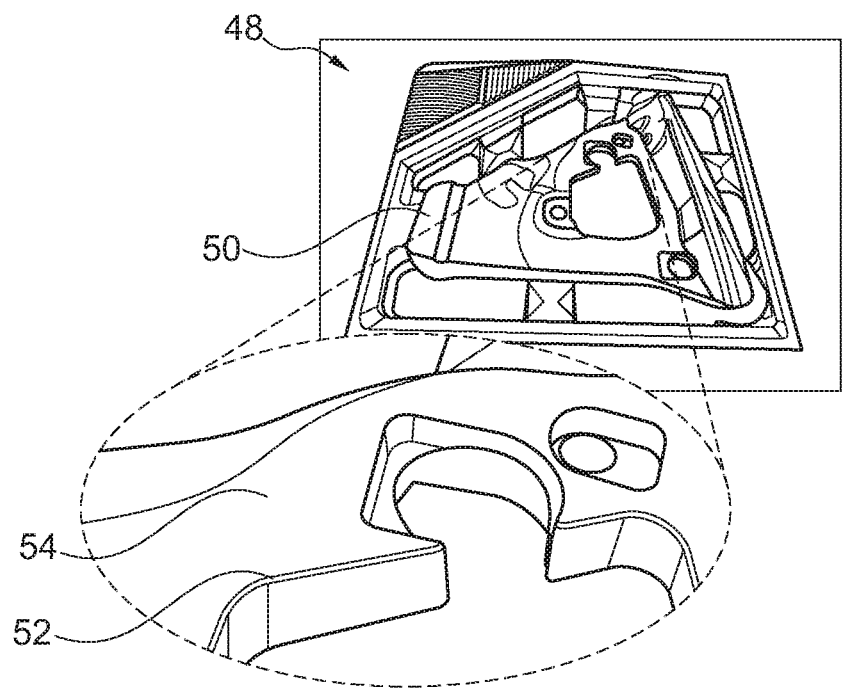
FIG. 5 is a perspective view and a detailed view of another alternative form of a production device constructed as a workpiece coordination device according to the present disclosure.

FIG. 5 is a perspective view and a detailed view of another alternative form of the production device according to the present disclosure constructed as a workpiece coordination device 48 (Part Coordination Fixture, PCF). The workpiece coordination device 48 is provided for component production in the automotive industry and serves to simulate a precise positioning of a component, in this possible form of a rear light, in a vehicle.

The production device is produced for the most part by an additive production method, that is to say, by 3D printing with selective laser melting (SLM), for example, from an aluminum-containing metal powder. In other possible forms, the production device may be produced from a steel-containing metal powder or a plastics material.

In order to discover undesirable manipulation in the workpiece coordination device 48 in a prompt manner, a signal layer (not illustrated) is provided in a region of the surface 50. The signal layer is covered externally by a surface termination layer 52 of the surface 50. The surface termination layer 52 has a predetermined layer thickness, whereby the signal layer, as already described for the other forms, in an initial state of the production device is arranged at a predetermined depth below the surface termination layer 52.

In comparison with the above forms, the predetermined depth of the signal layer is selected to be very much smaller since in this production device it is primarily not the identification of a wear state which is important, but instead the prompt discovery of a manipulation of the production device.

In order to produce the workpiece coordination device 48, the construction is first carried out with the exception of a region of the surface 50 by the SLM 3D printing method. In a following step of the method, the signal layer which in this potential form contains a copper-containing metal powder is produced by the SLM 3D printing method on the region of the surface 50. In a subsequent step, by the SLM 3D printing method, the surface termination layer 52 is produced from aluminum-containing metal powder with the predetermined layer thickness on the region of the surface 50. In this instance, the surface termination layer 52 is provided with an external texture 54 in the form of an undulating pattern.

A disruption of the texture 54 of the surface termination layer 52 can be readily visually identified by a user of the production device so that slight manipulations can also be identified. The signal layer which is produced from the, for example, copper-containing metal powder, differs in a visually clearly perceptible manner from the surface termination layer 52. An appearance of the signal layer shows the user of the production device directly that an undesirable manipulation has been carried out on the production device. Furthermore, it is possible to distinguish between a slight manipulation, by which only the texture 54 of the surface termination layer 52 is interrupted, and a more significant manipulation, which brings about an appearance of the signal layer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A positioning pin comprising:
   a surface subject to wear during sliding within a through-opening of a blank used to form a component;
   a plurality of adjacent signal layers disposed parallel to the surface;
   a surface termination layer comprising the surface and a predefined thickness, wherein the surface termination layer covers the plurality of adjacent signal layers such that each of the plurality of adjacent signal layers are arranged at a predetermined radial depth below the surface when the positioning pin is in an initial state, and each layer of the plurality of adjacent signal layers is visually distinct such that different degrees of radial wear of the surface along a length of the positioning pin are visually distinguishable.

2. The positioning pin of claim 1, wherein the positioning pin is at least one of a workpiece coordination device, shaping tool, shaping tool insert, quality control device, and an installation gage.

3. The positioning pin of claim 1, wherein each signal layer of the plurality of adjacent signal layers and the surface termination layer are visually distinct.

4. The positioning pin of claim 1, wherein two mutually adjacent signal layers of the plurality of adjacent signal layers have different colors.

5. The positioning pin of claim 1, wherein two mutually adjacent signal layers of the plurality of adjacent signal layers have different patterns.

6. The positioning pin of claim 1, wherein each of the plurality of adjacent signal layers includes a visually perceptible distinctive feature configured to visually differentiate each of the plurality of adjacent signal layers from the surface termination layer and a property of the visually perceptible distinctive feature changes within each of the plurality of adjacent signal layers according to a radial depth below the surface termination layer.

7. The positioning pin of claim 1, wherein the surface termination layer has an external texture.

8. The positioning pin of claim 1, wherein at least a proportion of the positioning pin is made of a thermoplastic or thermosetting plastics material.

9. The positioning pin of claim 1, wherein at least one signal layer of the plurality of adjacent signal layers and the surface termination layer is formed by at least one additive production method.

10. The positioning pin of claim 9, wherein the at least one signal layer is formed by a 3D color printer.

11. A positioning pin comprising:
    a surface having a plurality of regions and subject to wear during sliding within a through-opening of a blank used to form a component;
    a plurality of signal layers arranged in each region of the plurality of regions of the surface; and
    a surface termination layer comprising the surface and a predefined thickness, the surface termination layer covering the plurality of signal layers arranged in each region when the positioning pin is in an initial state,
    wherein each layer of the plurality of signal layers is produced by at least one additive production method and is visually distinct such that different degrees of radial wear of the surface along a length of the positioning pin are visually distinguishable.

12. The positioning pin of claim 11, wherein a property of a visually distinctive feature of each layer of the plurality of signal layers changes within each of the plurality of signal layers according to a radial depth below the surface termination layer.

13. The positioning pin of claim 11, wherein a visually distinctive feature of each layer of the plurality of signal layers is at least one of a color, a pattern, and a texture.

14. The positioning pin of claim 11, wherein the surface termination layer has an external texture.

15. A positioning pin comprising:
    a surface having at least one region and subject to wear during sliding within a through-opening of a blank used to form a component;
    a first signal layer arranged in the at least one region of the surface;
    a second signal layer adjacent the first signal layer; and
    a surface termination layer comprising the surface and a predefined thickness, the surface termination layer covering at least one of the first signal layer and the second signal layer when the positioning pin is in an initial state such that the first and second signal layers are arranged at a predetermined radial depth below the surface termination layer,
    wherein the first and second signal layers are visually distinct such that different degrees of radial wear of the positioning pin is visually distinguishable,
    wherein the first signal layer, the second signal layer, and the surface termination layer have a visually distinct feature and are produced by an additive production method.

16. The positioning pin of claim 15, wherein the visually distinct feature is at least one of a different color and a different pattern.

17. The positioning pin of claim 15, wherein a property of the visually distinct feature changes within the first and second signal layer according to a radial depth below the surface termination layer.

\* \* \* \* \*